United States Patent [19]

Goedken et al.

[11] Patent Number: 5,057,762
[45] Date of Patent: Oct. 15, 1991

[54] SYSTEM FOR DETERMINING BATTERY CHARGE STATES AND CHARGING SEQUENCE FOR A BATTERY CHARGER

[75] Inventors: Terrance J. Goedken, Schaumburg, Ill.; James F. Goedken, Dubuque, Iowa

[73] Assignee: Motorola, Inc., Schaumburg, Ill.

[21] Appl. No.: 559,763

[22] Filed: Jul. 30, 1990

[51] Int. Cl.$^5$ .............................................. H02J 7/04
[52] U.S. Cl. ........................................... 320/15; 320/2
[58] Field of Search .................... 320/2, 6, 15, 19, 21, 320/22, 23, 31, 35, 43, 14

[56] References Cited

U.S. PATENT DOCUMENTS

| | | | |
|---|---|---|---|
| 3,579,075 | 5/1971 | Floyd | 320/2 |
| 4,467,264 | 8/1984 | Blake et al. | 320/15 X |
| 4,766,361 | 8/1988 | Pusateri | 320/15 X |
| 4,792,743 | 12/1988 | Tsujino et al. | 320/15 |
| 4,843,299 | 6/1989 | Hutchings | 320/31 |
| 4,849,682 | 7/1989 | Bauer et al. | 320/15 |

Primary Examiner—Steven L. Stephan
Assistant Examiner—Kristine Peckman
Attorney, Agent, or Firm—Robert H. Kelly

[57] ABSTRACT

A battery charging system for determining battery charge states of batteries positioned to be charged by a battery charger. A fast charging current is supplied for short intervals to each of the batteries during a charge state determination period. After the end of the charge state determination period, the battery charge states of each of the batteries is determined. The determined battery charge states may be utilized to form a battery charging priority sequence for sequentially charging the batteries.

36 Claims, 4 Drawing Sheets

SYSTEM FOR DETERMINING BATTERY CHARGE STATES AND CHARGING SEQUENCE FOR A BATTERY CHARGER

BACKGROUND OF THE INVENTION

The present invention relates generally to battery charging systems, and, more particularly, to a battery charging system for accurately determining battery charge states of a plurality of batteries.

One or more batteries are frequently utilized as a power source to power an electrical device. In some instances, the use of a battery to power an electrical device is necessary to permit operation of the electrical device when the electrical device is not, or cannot be, positioned proximate to a permanent power supply.

A battery, however, can store only a finite amount of energy, and, after a period of use, the battery becomes discharged, necessitating replacement thereof to permit continued operation of the electrical device.

A battery is, for instance, essential to operate a portable or transportable radiotelephone. When operative to transmit or to receive an information signal, the radiotelephone dissipates power at a rate of approximately three watts. A battery coupled to power the radiotelephone when operative to dissipate energy at a rate of three watts, may become discharged in one hour, or even sooner if the battery is initially not fully charged. Once discharged beneath a certain level, the battery coupled to the radiotelephone must be removed and replaced with a new battery.

A rechargeable battery is advantageous for the reason that, after the battery has been discharged, the rechargeable battery may be recharged and resued. The same rechargeable battery may be recharged and reused up to, or even in excess of, five hundred times.

Battery charging apparatus exists and is readily available for recharging one or more rechargeable batteries. Typically, the battery charger is comprised of a support structure for supporting a plurality of batteries, and a current source for charging the batteries when suitably positioned upon the support structure and connected to the current source to permit charging thereof. Application of a charging current generated by the current source to the batteries for a period of time recharges the batteries. The amount of time during which the charging current must be applied to the batteries is dependent upon the battery type, the extent to which the individual ones of the batteries have been discharged, and the magnitude of the charging current applied to the batteries.

Some types of battery charging apparatus supply a relatively small current (e.g., a C/10 value wherein c is defined to be the one-hour capacity of a battery) to the batteries, and other types of battery charging apparatus supply a significantly larger current (e.g., a C value) to the batteries. The process of applying a large current to the batteries is referred to as fast charging of the batteries. Still other types of battery charging apparatus permit either the relatively small current or the fast charging current to be supplied to the battery.

For reasons of convenience, applying the fast charging current to the batteries is advantageous. However, only certain types of batteries may be charged with a fast charging current. Nickel-cadmium type (Ni-Cd) batteries are one type of rechargeable battery which may be charged with the fast charging current. Additionally, even when the battery construction is of a type permitting application of a fast charging current thereto, care must be exercised to ensure that application of the fast charging current to the battery is terminated once the battery has been fully charged. Overcharging of a battery can cause gassing, electrolytic venting of the battery, permanent loss of the battery capacity and actual physical damage to the battery.

Therefore, battery charging apparatus of constructions which permit fast charging of one or more rechargeable batteries regularly include means for automatically terminating application of the fast charging current to the battery (or batteries) once the battery has been fully charged. For instance, all of the following methods are known for determining when a battery has been fully charged: coulometric control, time control, pressure sensing, temperature sensing, incremental temperature cut-off, differential temperature cut-off, rate of temperature change, voltage magnitude sense, positive rate of voltage change, inflection point cut-off, voltage decrement cut-off, and negative voltage change. Additionally, U.S. patent application Ser. No. 519,532 filed on May 4, 1990, and entitled "System For Fast Charging for a Battery" to Goedken, et al. discloses a fast charge termination technique wherein both the first and the second derivatives of voltages measured across output terminals of a battery are calculated. Only when both the first and the second derivatives of the voltages measured across the output terminals of the battery are negative values is the fast charging of the battery terminated.

Several battery charger constructions permit recharging of a plurality of batteries when each of the batteries are positioned in a parallel electrical connection therebetween. Application of the fast charging current to the batteries positioned in the parallel connection therebetween causes current to be applied to each of the batteries. However, individual ones of the batteries may become fully charged at different times due, for example, to variances of battery characteristics of particular ones of the batteries and the extent to which particular ones of the batteries have been discharged prior to charging thereof. Such battery charger constructions are therefore of limited usefulness for fast charging batteries. When a first of the batteries positioned in parallel becomes fully charged, fast charging thereof should be terminated to prevent damage to that battery. Termination of fast charging, however, results in incomplete charging of the other batteries positioned in parallel with the fully charged battery. Battery charger constructions in which the batteries are positioned in parallel are most frequently utilized when only a slow charging current is applied to the batteries. Because battery overcharging is not a significant problem when a slow charging current is applied to a battery, termination of charging of all of the batteries is not required once one of the batteries becomes fully charged.

More frequently, battery charger constructions which permit fast charging of a plurality of batteries sequentially charge each of the batteries. That is, the fast charging current is applied to only one battery at a time. Once a first battery has been fully charged, fast charging of that battery is terminated, and the fast charging current source is connected to a second of the batteries. In order to fully charge each of the plurality of batteries positioned to permit recharging thereof, the fast charging current is applied to each of the batteries in sequence. The amount of time required to fully charge the plurality of batteries is dependent upon the number of batteries positioned for recharging thereof and the extent to which the batteries have been discharged.

Some battery chargers provide some type of indication of the charge states of the batteries positioned thereat for recharging. In order to indicate the charge states of the batteries, the charge states of the batteries must first be determined. An accurate determination of the charge state of a battery requires application of a current to a battery for a period of time. Because sequential battery chargers sequentially apply a charging current to the batteries, most existing sequential battery chargers provide an indication of the charge state of only the battery undergoing charging thereof.

What is needed, therefore, is a means for accurately determining the charge states of every battery positioned at a sequential battery charger.

In many instances, electrical devices are designed such that only one battery is required to operate the electrical device. For instance, a conventional radiotelephone is typically operated by a single battery. After operation of the radiotelephone, the battery becomes discharged, necessitating replacement thereof. Once removed from the radiotelephone, and positioned to be charged by battery charger apparatus, the radiotelephone user is usually more interested in quickly recharging one battery, as only one battery is required for operation of the radiotelephone, rather than waiting a greater period of time while a plurality of batteries are recharged.

Therefore, attempts have been made to provide battery charging apparatus to charge first a particular one of a plurality of batteries. Most simply, a certain position, such as a first charging pocket formed of a portion of a battery charger, may be defined as a "priority charging location". A battery positioned at the priority charging location is charged before any other battery. Only when the battery positioned at the priority charging location is fully charged, are any of the other batteries connected to the fast charging current source.

U.S. Pat. No. 4,849,682 discloses a battery charging system for sequentially charging a plurality of batteries. According to the disclosed system, once the batteries are positioned at a battery charger to permit recharging thereof, each battery is checked, or "interrogated", to determine the level of charge (i.e., the charge state) of the battery. The battery having the highest level of charge (i.e., charge state) is assigned a highest priority, and is the battery which is first connected to the supply of fast charging current to charge the battery thereby. The temperature of the battery may additionally be measured, and only the battery which is of the highest charge state, and is of a temperature within a range suitable for charging thereof, is assigned highest priority and connected to the fast charging current source. The battery charging system further discloses a means for delivering a higher than rated, fast charging current source to the battery assigned highest priority for a subinterval of a time interval. The current average of the fast charging current applied to the battery assigned the highest priority, however, corresponds to the rated fast charging current to be applied to the battery. An equalizer current is supplied to a second of the batteries positioned to permit charging thereof during other subintervals of the time interval.

The system, however, is based upon the assumption that, upon positioning of the batteries at the battery charger to permit charging thereof, the actual charge states of the battery are immediately determinable. In fact, upon such initial checking or "interrogation" of the batteries, the batteries oftentimes exhibit charge levels which are only transitory or which may be indicative of more than one charge state. Hence, the determined charge states oftentimes do not accurately represent the actual charge state of the battery. The disclosed system may, therefore, assign highest priority to fast charge a battery which is actually of a lower charge state than another one of the batteries. Such a determination prevents a fastest possible charging sequence for recharging a single battery of a plurality of batteries.

What is needed, therefore, is a battery charging system which accurately determines battery charge states of a plurality of batteries to determine thereby an optimal battery charging sequence for sequentially charging a plurality of batteries.

SUMMARY OF THE INVENTION

It is, accordingly, an object of the present invention to provide a battery charging system which accurately determines the charge state of batteries positioned at a sequential battery charger.

It is a further object of the present invention to provide a battery charging system which accurately determines a battery charging sequence for sequentially charging a plurality of batteries.

It is a further object of the present invention to provide a battery charging system which forms a battery charging priority sequence to charge sequentially a plurality of batteries responsive to an accurate determination of the charge states of the batteries.

It is yet a further object of the present invention to provide a radiotelephone battery charging system for sequentially charging a plurality of radiotelephone batteries positioned in a radiotelephone battery charger to be charged thereat.

In accordance with the present invention, therefore, a battery charging system, and associated method therefor, for determining battery charge states of a plurality of batteries positioned in a battery charger is disclosed. A fast charging current is applied to selected ones of the batteries positioned in the battery charger wherein the charging current is applied at least one time to each of the selected ones of the batteries during a charge state determination period. The battery charge states of each of the selected ones of the batteries is determined after application of the charging current thereto. In a further embodiment of the present invention, a battery charging priority sequence to charge desired ones of the batteries in a desired sequence is additionally formed responsive to the determined battery charge states.

BRIEF DESCRIPTION OF THE DRAWINGS

The present invention will be better understood when read in light of the accompanying drawings in which.

DETAILED DESCRIPTION OF THE PREFERRED EMBODIMENT

Figure 1A:
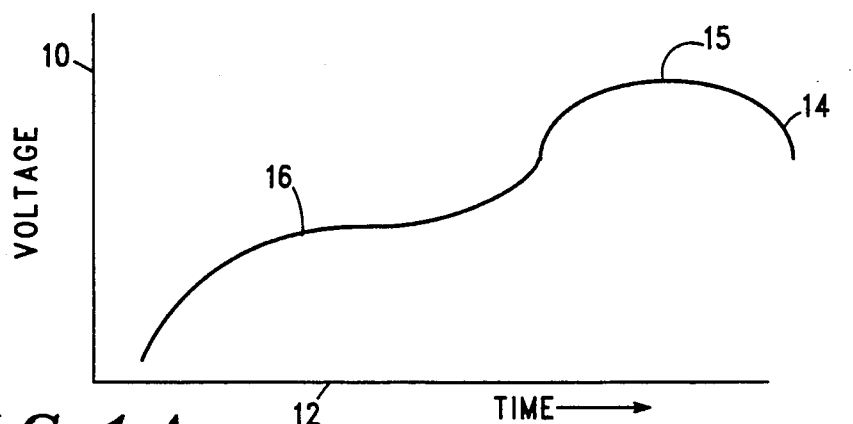
FIG. 1A is a graphical presentation of a typical battery charging curve wherein voltage measured across output terminals of a battery during charging thereof is plotted as a function of time.

Referring first to the graphical representation of FIG. 1, the voltage measured across outputs terminals of a typical nickel-cadmium rechargeable battery is plotted as a function of time wherein the voltage, scaled in terms of volts, is plotted along ordinate axis 10, and time, scaled in terms of seconds, is represented along abscissa axis 12. The resultant curve 14, referred to as a battery characteristic charge curve, generally increases over time responsive to the application of a charging current to the battery. As illustrated, this increase is not necessarily linear. However, upon continued application of the charging current to the battery, the voltage of the battery increases until the battery is fully charged. Line 15 indicates the location at which the battery, as represented by curve 14, becomes fully charged. Also illustrated in FIG. 1A is curved portion 16, shown in hatch, which, in some instances, forms a portion of characteristic charge curve 14. In some instances, upon initial application of a charging current to a battery, the battery voltage (as measured across the output terminals thereof) decreases.

Figure 1B:
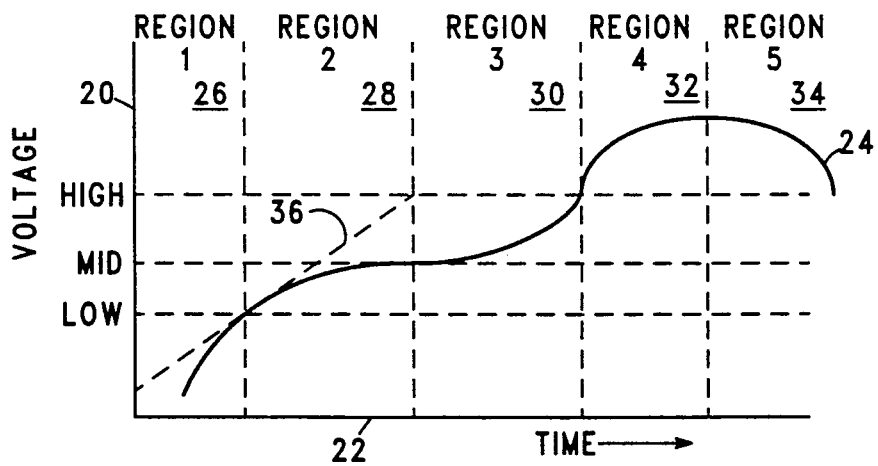
FIG. 1B is a graphical representation, similar to that of FIG. 1A, but further illustrating charge state regions utilized to define the charge state of a battery.

The graphical representation of FIG. 1B is similar to that of FIG. 1A, and is a plot of voltage, scaled in terms of volts, on ordinate axis 20 measured across output terminals of a battery during charging thereof as a function of time, scaled in terms of seconds, on abscissa axis 22. Curve 24, similar in shape to that of curve 14 of FIG. 1A, generally increases over time, although the increase is not necessarily linear. FIG. 1B further illustrates five charge state regions 26–34. The boundaries of regions 26–34 are determined by the characteristics of the typical curve 24 including voltage levels—indicated by "HIGH", "LOW", and "MID"—and at least one rate of change (i.e., slope) of the voltage—indicated by line 36, and are utilized by the present invention to provide an indication of the charge state of a battery during charging thereof. When the measured voltage of a battery corresponds to a portion of curve 24 positioned in one of the regions 26–34, the charge state of the battery is defined in terms of regions 26–34. A battery state of charge detector which defines the charge state of a battery in terms of regions similar regions 26–34 of FIG. 1B is discussed further in U.S. patent application Ser. No. 519,531 filed by Goedken, et al. on May 4, 1990, and entitled "Method and Apparatus for Detecting the State of Charge of a Battery". Greater or fewer numbers of charge state regions 26–34 may be defined, as desired.

A determination of the charge state of a battery responsive to a determination of where upon a battery characteristic charge curve an actual battery undergoing charging should be positioned requires the application of a fast charging current to the battery for an extended period of time. While a determination of the battery charge state by such a method most accurately determines the charge state of a battery, such a method cannot be utilized to indicate the charge states of each of a plurality of batteries positioned at a sequential battery charger while also quickly fast charging only one of the batteries.

Because the voltage (measured across output terminals) of a battery generally increases during charging thereof, an indication of the charge state of the battery may be quickly determined by application of a charging current thereto. The charging current must, however, be applied to the battery for a great enough period of time to avoid incorrect (i.e., transient) indications of voltage such as voltages represented by curve portion 16 of FIG. 1A. As mentioned previously, at least one existing battery charging system for a sequential battery charger interrogates each battery positioned at a sequential battery charger to determine the voltage of each of the batteries. However, the system does not provide a means to avoid erroneous charge state determinations responsive to measured voltages which in some cases are actually only indicative of transient values. As will be described more fully hereinbelow, the present invention provides a system for quickly, and accurately, determining the charge state of every battery positioned at a sequential battery charger, and not just the battery undergoing fast charging.

The existing battery charging system which interrogates each battery to determine the charge state thereby, assigns a charging priority to each of a plurality of batteries. The batteries are sequentially charged according to the priority assigned thereto. However, the charging priority of the batteries is determined responsive to instantaneous indications of the voltage measured across output terminals of a battery. Because the system does not, in all instance, accurately determine the true voltage of each of the batteries, a priority assigned to a battery to determine priority of charging thereof in a sequential battery charger may incorrectly assign priorities as the instantaneous voltage measured across a battery does not always indicate a true indication of a battery charge state. As will further be described more fully hereinbelow, the present provides a system for accurately determining a charging sequence for charging a plurality of batteries positioned at a sequential battery charger to be charged thereat.

Figure 2:
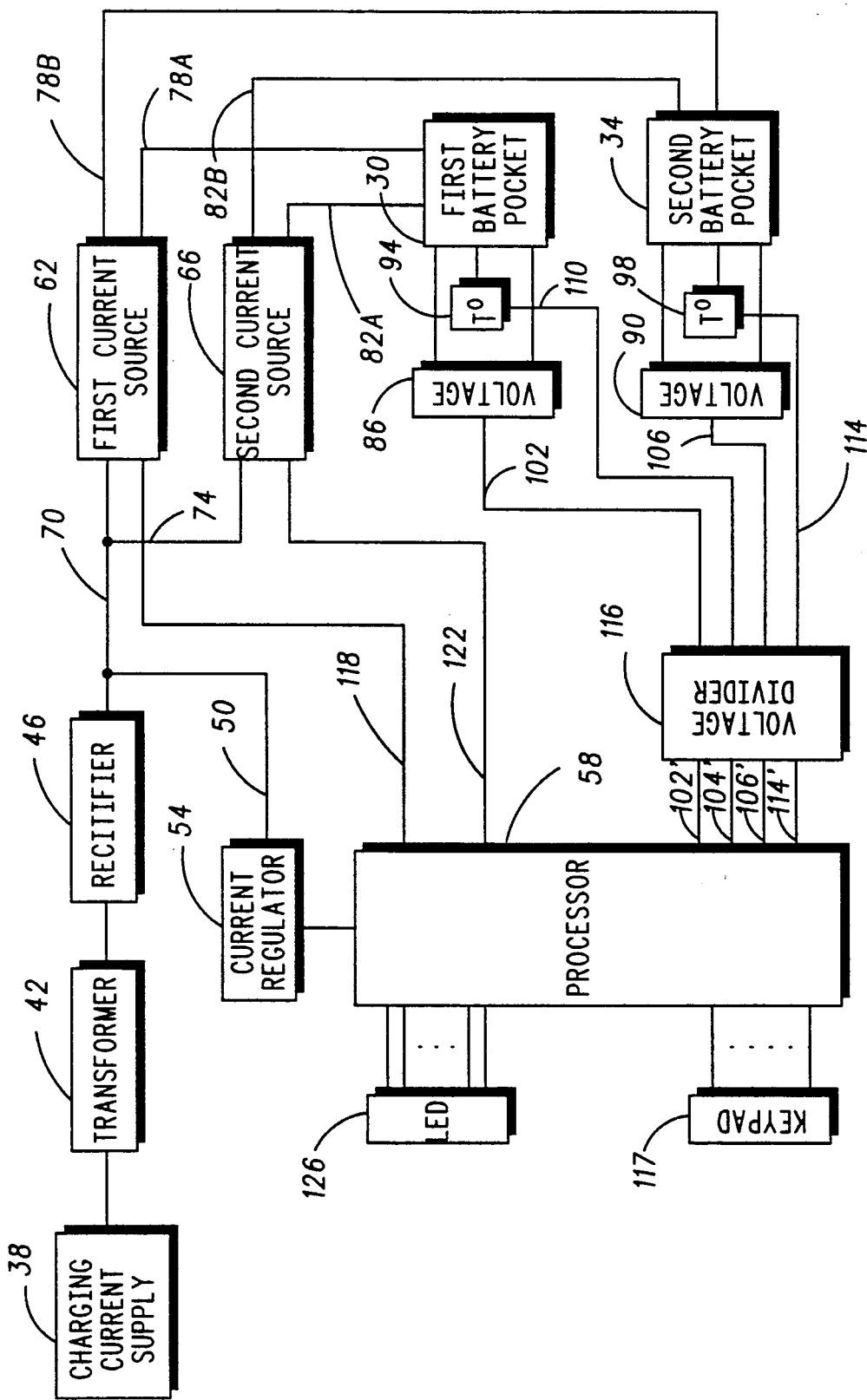
FIG. 2 is a block diagram of a circuit which embodies the battery charging system of the preferred embodiment of the present invention.

Turning now to the block diagram of FIG. 2, a circuit which embodies the system of the present invention is shown. The system of the present invention obtains indications of the true voltage of each battery positioned at a sequential battery charger. In its fullest embodiment, the system of the present invention, rather than assigning a priority of charging to a plurality of batteries responsive merely to instantaneous indications of battery voltage, applies a charging current to each of the batteries positioned for charging thereof for a period of time (referred to as a charge state determination period) prior to establishing the charging priority sequence. By applying a charging current to the battery for at least a minimum period of time, erroneous charge state indications are avoided. The battery charging priority sequence established by the system of the present invention, by ensuring that actual charge states of a battery are determined, accurately establishes an optimal charging sequence for charging any number of batteries.

While the block diagram of FIG. 2 illustrates a two-pocket charging system, it is to be noted that the system of the present invention may be similarly utilized to determine battery charge states, and additionally, to determine a battery charging sequence for a battery charger containing greater numbers of battery pockets which can, hence, sequentially charge greater numbers of batteries.

Therefore, while FIG. 2 illustrates first battery pocket 30 and second battery pocket 34, the system of the present invention may be utilized to determine battery charge states, and to establish a charging sequence for a battery charger having a greater number of battery pockets. Pockets 30 and 34 are electrically connected, as will be described hereinbelow, to receive current generated by charging current supply 38. Supply 38 may be comprised of a conventional, AC power supply, such as, for example, a power supply formed by a conventional household electrical outlet. Charging current supply 38 may, of course, alternately be comprised of a DC power supply.

A primary side of transformer 42 is coupled to receive the current of charging current supply 38. When charging current supply 38 is comprised of the conventional, household electrical outlet, transformer 42 is connected thereto by conventional, pronged connectors suitable for insertion into the electrical outlet. Rectifier circuit 46 is coupled to a secondary side of transformer 42 in embodiments in which charging current source 38 is comprised of an AC source. Rectifier 46 rectifies and, preferably, additionally converts the rectified signal to a DC signal. The rectified signal generated by rectifier 46 is supplied on line 50 to current regulator 54. Current regulator 54 generates a regulated current which is utilized to power processor 58.

The rectified signal generated by rectifier 46 is additionally supplied to first and second current sources 62 and 66 on lines 70 and 74, respectively. First current source 62 generates a current of a first magnitude on lines 78A and 78B, and second current source 66 generates a current of a second magnitude on lines 82A and 82B. Lines 78A and 82A are coupled to first battery pocket 30, and lines 78B and 82B are coupled to second battery pocket 30, and lines 78B and 82B are coupled to second battery pocket 34 to supply thereby the current generated on lines 78A-B and 82A-B to batteries positioned at the pockets 30 and 34. The current generated by first current source 62 on lines 78A-B is of a magnitude to permit fast charging of a battery positioned in pocket 30 or 34, and the magnitude of the current generated by a second current source 66 on lines 82A-B is of a much smaller magnitude.

Voltage measuring means 86 is appropriately coupled to first battery pocket 30 to permit measurement of voltage levels across output terminals of a battery when suitably positioned at pocket 30. Similarly, voltage measuring means 90 is appropriately coupled to second battery pocket 34 to permit measurement of the voltage across output terminals of batteries suitably positioned at the pocket 34.

Temperature measuring means 94 is positioned proximate to first battery pocket 30 to permit measurement of the temperature of a battery positioned at the pocket 30. Similarly, temperature measuring means 98 is positioned proximate to second battery pocket 34 to permit measurement of a battery temperature of a battery positioned in the pocket 34.

Voltage measuring means 86 and 90 output signals indicative of the voltages of batteries positioned in pockets 30 and 34 on lines 102 and 106, respectively.

Temperature measuring means 94 and 98, similarly, output signals indicative of measured temperature levels of batteries positioned in pockets 30 and 34 on lines 110 and 114, respectively.

Lines 102-114 are coupled to voltage divider 116 which generates signals on lines 102'-114' corresponding to the signals supplied thereto on lines 102-114, but of levels suitable for input to processor 58. Processor 58 also receives inputs from other sources such as, for example, from keypad 117, and may be utilized to perform other functions. Processor 58 generates output signals on lines 118 and 122 which are coupled to current sources 62 and 66, respectively. The signals generated on lines 118 and 122 are determinative of when the current generated by sources 62 and 66 are supplied to pocket 30 and/or 34. Processor 58 additionally generates other outputs, including outputs to power indicating devices such as light emitting diodes 126. A battery charger having LED indicators for idicating battery charge state and charging current levels is discussed further in U.S. patent application Ser. No. 361,534, entitled, "Multiple Battery, Multiple Rate Battery Charger", filed by Johnson on June 5, 1989.

Figure 3:
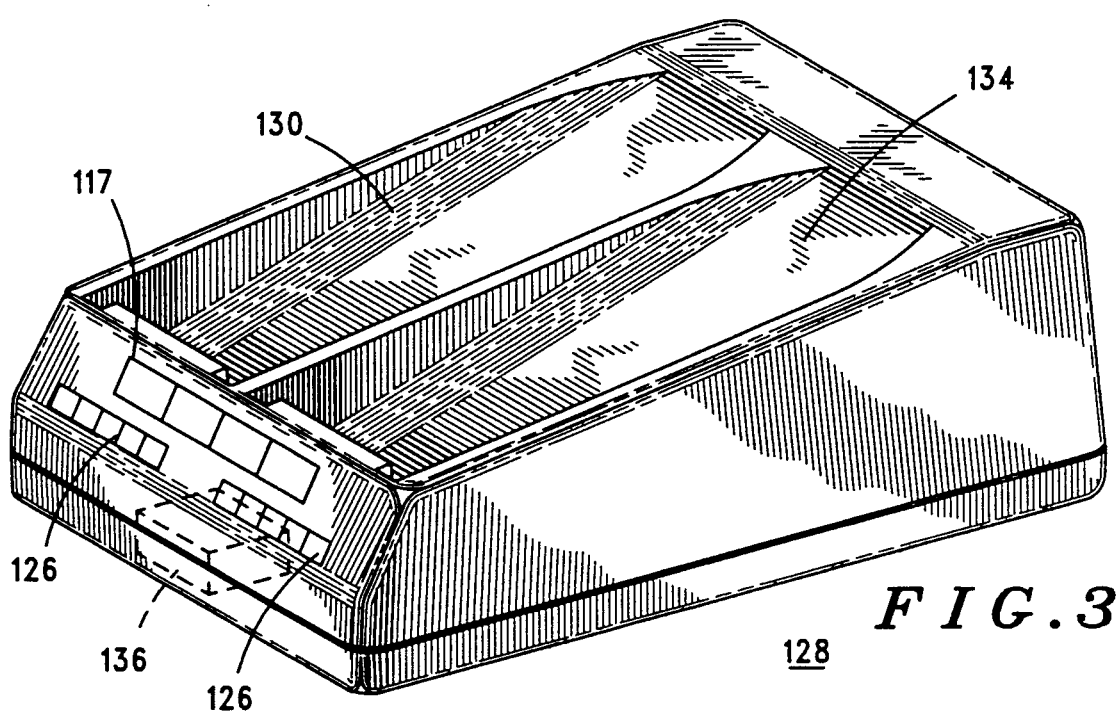
FIG. 3 is an isometric view of a battery charger constructed according to the teachings of the present invention of which the circuit of FIG. 2 forms a portion thereof.

Turning now to the isometric illustration of FIG. 3, a battery charger, referred to generally by reference numeral 128, which employs the system of the present invention is shown. Battery charger 128 includes battery charging pockets 130 and 134 formed on a top surface of a housing thereof. The circuit of FIG. 2 may be supported within the housing of charger 128, and is illustrated in FIG. 3 by block 136 shown in hatch. LEDs 126 and keypad 117 are positioned upon a face surface of the housing of charger 128. While not illustrated in the isometric view of FIG. 3, suitable connections are made between battery pockets 130 and 134, LEDs 126, keypad 117 and the remaining portions of the circuit of FIG. 2 as represented by block 136.

Figure 4:
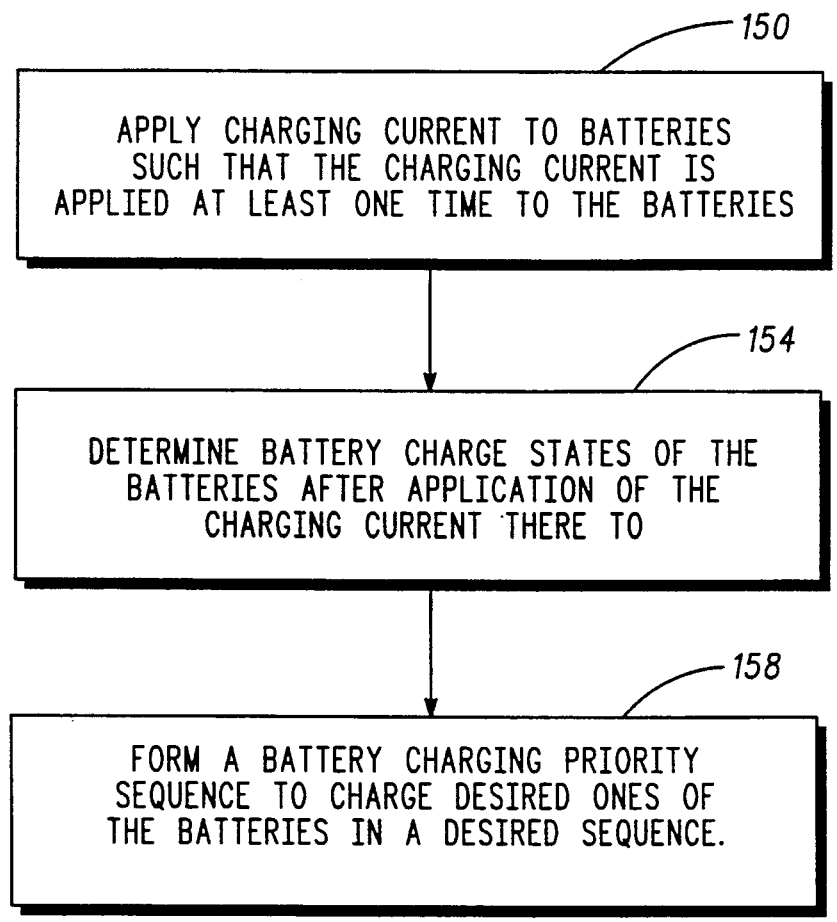
FIG. 4 is a flow diagram illustrating the method steps of the method of the present invention.

Turning now to the flow diagram of FIG. 4, the method steps of the method of the present invention for determining a battery charging sequence for sequentially charging a plurality of batteries positioned in a battery charger are shown. First, and as indicated by block 150, a charging current is applied to selected ones of battery positioned in a battery charger wherein the charging current is applied at least one time to each of the selected ones of the batteries during a charge state determination. Next, and as indicated by block 154, the battery charge state of each of the selected ones of the batteries are determined after application of the charging current thereto. Finally, and as indicated by block 158, in the fullest embodiment of the present invention, a battery charging priority sequence is formed to charge desired ones of the battery in a desired sequence responsive to determinations of the battery charge state.

Figure 5:
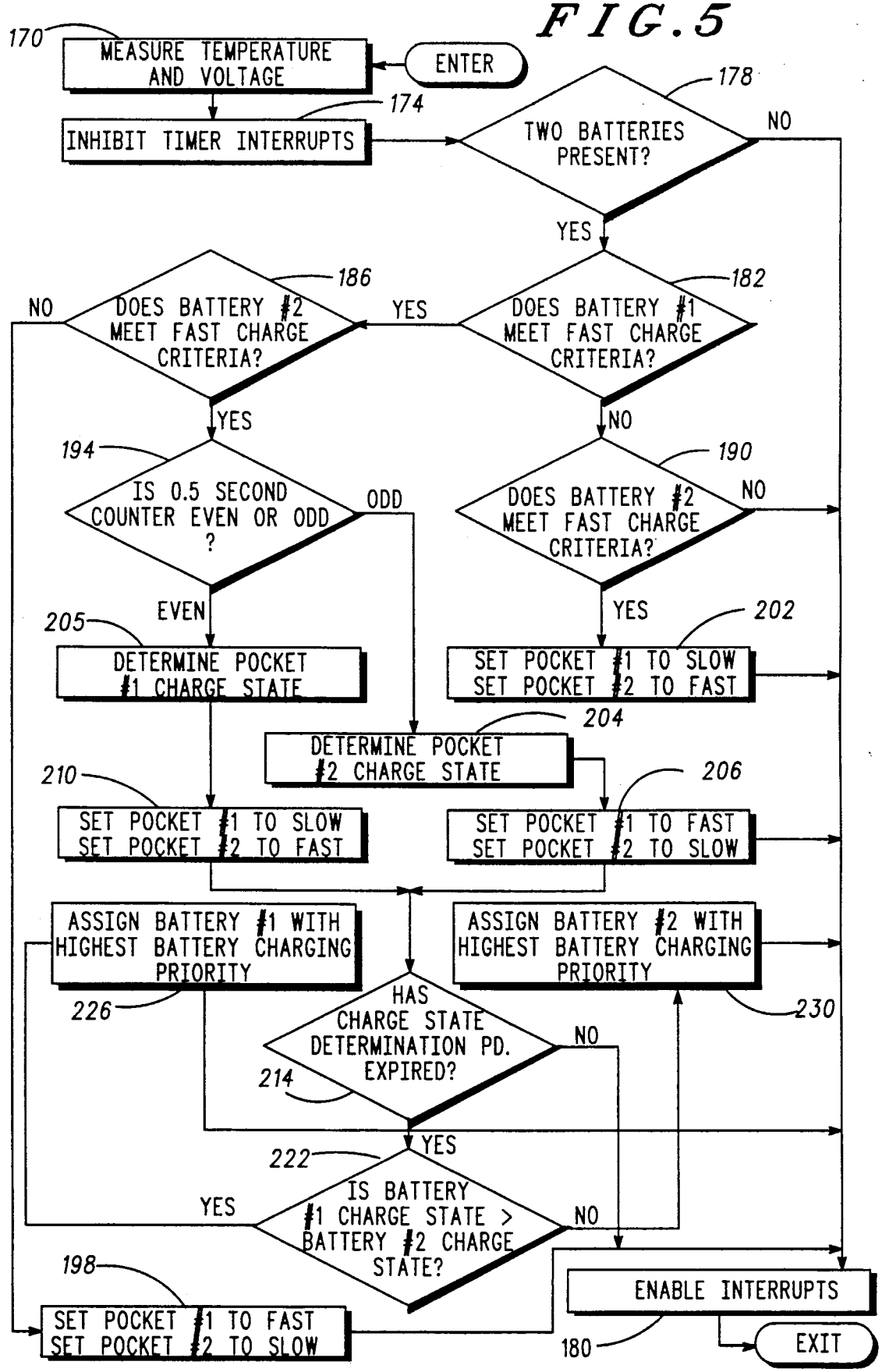
FIG. 5 is a flow diagram of an algorithm utilized to determine a battery charging sequence for a two-pocket battery charging system according to the preferred embodiment of the present invention.

Turning now to the flow diagram of FIG. 5, the steps of the method of a preferred embodiment of the present invention are shown. It is to be noted that, while the flow diagram illustrates the methods steps for establishing a battery charging priority sequence of a two-pocket battery charger for charging two batteries suitably positioned thereat, a similar method may be applied to establish a priority sequence of a battery charger constructed to permit sequential charging of more than two batteries.

First, and as indicated by block 170, after entering the routine, the battery temperatures and voltages of the batteries positioned at pockets 30 and/or 34 are measured. Next, and as indicated by block 174, timer interrupts are inhibited. Next, and as indicated by decision block 178, a determination is made as to whether a battery is positioned in both battery pocket 30 and battery pocket 34 responsive to the measured values of battery voltage.

More particularly, in the preferred embodiment of the present invention, the presence of batteries in battery pockets 30 and/or 34 is determined by voltage measuring means 86 and 90, respectively, by detecting the voltage drop across output terminals of battery positioned in the respective pockets 30 and/or 34.

If batteries are positioned in each of the pockets, the YES branch is taken from block 178 to decision block 182. Otherwise, the NO branch is taken to exit through enable interrupt block 180 as no charging sequence is required to be determined. It is to be noted that when the method of the present invention is utilized in conjunction with a battery charger having more than two battery charging pockets, that at least two batteries must be present in order to determine a charging sequence.

Decision block 182 determines whether the battery positioned in first battery charging pocket 30 is of battery characteristics suitable to permit fast charging thereof. The battery temperature determined by temperature monitoring means 94 may be utilized to ensure that the battery temperature of the battery positioned in battery charging pocket 30 is within a temperature range which permits fast charging thereof. If the battery is of battery characteristics to permit fast charging thereof, the YES branch is taken to decision block 186. Otherwise the NO branch is taken to decision block 190.

Decision block 186 determines whether the battery positioned in battery charging pocket 34 is of battery characteristics to permit fast charging thereof. Again, the battery temperature determined by temperature monitoring means 98 may be utilized to ensure that the temperature of the battery positioned at battery pocket 34 is within a range of temperatures suitable for fast charging thereof. If the battery is of battery characteristics to permit fast charging thereof, the YES branch is taken to decision block 194. Otherwise the NO branch is taken to block 198.

At decision block 190, a determination is made, similar to the determination of decision block 186, as to whether the battery positioned at battery pocket 34 is of battery characteristics to permit fast charging thereof. Again, the battery temperature determined by temperature monitoring means 98 may be utilized to ensure that the battery positioned at battery pocket 34 is of a temperature within an allowable temperature range. If the battery is of battery characteristics suitable to permit fast charging thereof, the YES branch is taken to block 202. Otherwise, the NO branch is taken, and, because neither the battery positioned in pocket 30 nor the battery positioned in pocket 34 is of battery characteristics to permit fast charging thereof, neither battery is permitted to be fast charged, and no priority sequence is required to be formed. Therefore, the NO branch is taken to exit through block 180.

If the YES branch is taken to block 202, then the battery positioned in battery pocket 30 is not of battery characteristics to permit fast charging thereof, but the battery positioned in battery pocket 34 is of battery characteristics to permit fast charging thereof. Therefore, and as indicated by block 202, a fast charging current is applied to the battery positioned at battery pocket 34, and a slow charging current is applied to the battery positioned pocket 30. Output signals generated by processor 58 of FIG. 2 on lines 118 and 122 may be utilized to control application of the currents generated by current sources 62 and 66 to pockets 30 and 34, respectively. Because no priority sequences are required, as only one of the batteries is of battery characteristics to permit fast charging thereof, after applying a fast charging current to the battery positioned at pocket 34, and a slow charging current to the battery positioned at pocket 30, a branch is taken to exit through block 180.

Similarly, if the NO branch is taken from the decision block 186, the battery positioned at first battery pocket 30 is of battery characteristics to permit fast charging thereof, but the battery positioned at second battery pocket 34 is not of battery characteristics to permit fast charging thereof. Therefore, and as indicated at block 198, a fast charging current is applied to the battery positioned at first battery pocket 30 to permit fast charging thereof, and a slow charging current is applied to the battery positioned at second battery pocket 34. Output signals generated by processor 58 on lines 118 and 122 may be utilized to control the application of the current generated by current sources 62 and 66 to battery pockets 30 and 34, respectively. Again, because only one battery is of battery characteristics to permit fast charging thereof, no battery charging priority sequence is required. After applying a fast charging current to the battery positioned at pocket 30, and a slow charging current to the battery positioned at pocket 34, a branch is taken to exit through block 180.

If the YES branch is taken to decision block 194, batteries are positioned at first battery pocket 30 and second battery pocket 34, and, additionally, each of the batteries are of battery characteristics to permit fast charging thereof. Therefore, a battery charging priority sequence is required. In order to ensure that the battery charge state determination of the charge state of each of the batteries is accurate, instantaneous indications of the charge state must be avoided. Therefore, at decision block 194, a one-half second counter is started and is incremented at one-half second intervals. The one-half second counter, preferably, is comprised of an algorithm contained in processor 58.

Decision block 194 determines whether the counter value is of odd or even value. If the counter is of an odd value, the ODD branch is taken to block 204. If the counter is of an even value, the EVEN branch is taken to block 205. If the counter is of an odd value, and as indicated by block 204, the charge state of the battery positioned at second battery pocket 34 is determined. Processor 58 may determine the charge states of the batteries positioned at battery pockets 30 and 34, as mentioned previously with respect to FIG. 1B, by measuring the magnitude of the voltages across output terminals of the batteries. Thereafter, and as indicated by block 206, a fast charging current is applied to the battery positioned at first battery pocket 30, and a slow charging current is applied to the battery positioned at second battery pocket 34.

Conversely, if the counter is of an even value, and as indicated by block 205, the charge state of the battery positioned at first battery pocket 30 is determined. Again, processor 58 may determine the charge states of the batteries positioned at battery pockets 30 and 34, as mentioned previously with respect to FIG. 1B, by measuring the magnitude of the voltages across output terminals of the batteries. Thereafter, and as indicated by block 210, a slow charging current is applied to the battery positioned at first battery pocket 30, and a fast charging current is applied to the battery positioned at second battery pocket 34.

Blocks 206 and 210 extend to decision block 214 whereat a determination is made as to whether a charge state determination period (e.g., a two minute period) has expired. If not, the NO branch is taken to exit, and the routine may then be re-executed. If the period has expired, each of the batteries have been charged with a fast charging current for one-half of the two minute period, or for one-minute.

If the charge state determination period has expired, the YES branch is taken to decision block 222. Finally, at decision block 222, a determination is made as to whether the charge state of the battery positioned at battery pocket 30 is greater than the charge state of the battery positioned at second battery pocket 34. If so, the YES branch is taken to block 226 whereat, and as inidcated, the battery positioned at first battery pocket 30 is assigned highest priority for sequential charging thereof. Conversely, if the charge state of the battery positioned at second battery pocket 34 is greater than the charge state of the battery positioned at battery pocket 30, NO branch is taken to block 230 and the battery positioned at second battery pocket 34 is assigned highest priority for sequential charging thereof.

Because the battery of the highest charge state is given highest priority for charging purposes, a battery may be fully recharged in a least amount of time. Once a first of the batteries is fully recharged, the second of the batteries, or any subsequent battery, may then be charged. Because the system of the present invention provides a charging current to each of the batteries for a portion of a charge state determination period, incorrect charge state determinations resulting in a non-optimal charging priority sequence are avoided. Because the charge state determination period is of as little as, or even less than, two minutes in duration, an operator of the battery charger is not inconvenienced as the fast charging current is applied to the desired battery for all but one minute of a charging cycle.

While the present invention has been described in connection with the preferred embodiment of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A battery charging system for determining battery charge states of a plurality of batteries positioned in a battery charger, said system comprising:
means for applying a fast charging current to selected ones of the batteries positioned in the battery charger, wherein said charging current is applied to each of the selected ones of the batteries during at least a portion of a charge state determination period; and
means for determining battery charge states of each of the selected ones of the batteries after application of said charging current thereto.

2. The battery charging system of claim 1 wherein said charging current is sequentially applied at least one time to each of the selected ones of the batteries.

3. The battery charging system of claim 2 wherein said means for applying further comprises a multiplexer for sequentially connecting each of the selected ones of the batteries to the charging current to sequentially apply the charging current to each of the selected ones of the batteries thereby.

4. The battery changing system of claim 1 wherein said means for applying further comprises means for determining the number of batteries positioned for charging thereof in the charger.

5. The battery charging system of claim 1 wherein said means for applying further comprises means for selecting batteries of battery characteristics suitable for fast charging thereof.

6. The battery charging system of claim 1 wherein said charge state determination period comprises a period of at least two minutes.

7. The battery charging system of claim 6 wherein said charging current is sequentially applied to each of the selected ones of the batteries for one half second intervals during the charge state determination period.

8. The battery charging system of claim 1 further comprising means for calculating lengths of the charge state determination period.

9. The battery charging system of claim 8 wherein said means for calculating lengths of the state determination period comprises a processor.

10. The battery charging system of claim 1 wherein said means for determining comprises a processor.

11. The battery charging system of claim 1 further comprising means for forming a battery charging priority sequence to charge desired ones of said selected ones of the batteries according to the battery charging priority sequence formed thereby responsive to determined battery charge states.

12. The battery charging system of claim 11 further comprising means for charging the desired ones of the selected ones of the batteries according to said battery charging priority sequence.

13. The battery charging system of claim 12 wherein said battery charging priority sequence formed by the means for forming assigns a higher battery charging priority sequence to those of said selected ones of the batteries having greater battery charge states.

14. The battery charging system of claim 13 wherein said battery charging priority sequence formed by the means for forming includes only batteries having battery charge states indicative of batteries having less than fully charged states.

15. The battery charging system of claim 1 further comprising means for indicating battery charge states of the selected ones of the batteries.

16. The battery charging system of claim 1 further comprising means for applying a slow charging current to each of the bateries positioned in the battery charger.

17. A method for determining battery charge states of a plurality of batteries positioned in a battery charger, said method comprising the steps of:
applying a charging current to selected ones of the batteries positioned in the battery charger wherein said charging current is applied to each of the selected ones of the batteries during at least a portion of a charge state determination period; and
determining battery charge states of each of the selected ones of the batteries after application of said charging current thereto.

18. The method of claim 17 wherein the charging current applied during said step of applying is sequentially applied at least one time to each of the selected ones of the batteries.

19. The method of claim 18 wherein a multiplexer sequentially connects each of the selected ones of the batteries to the charge current to sequentially apply the charging current to each of the selected ones of the batteries thereby.

20. The method of claim 17 wherein said step of applying further comprises determining the number of batteries positioned for charging thereof in the battery charger.

21. The method of claim 20 wherein said step of applying further comprises selecting batteries of battery characteristics to permit fast charging thereof.

22. The method of claim 17 wherein said charge state determination period comprises a period of at least two minutes.

23. The method of claim 22 wherein the charging current applied during said step of applying is sequentially applied to each of the selected ones of the batteries for one half second intervals during the charge state determination period.

24. The method of claim 17 comprising the further step of calculating lengths of the charge state determination period.

25. The method of claim 24 wherein said step of calculating is performed by a processor.

26. The method of claim 17 wherein said step of determining is performed by a processor.

27. The method of claim 17 comprising the further step of forming a battery charging priority sequence to charge desired ones of said selected ones of the batteries in a desired sequence responsive to determinations of the battery charge states.

28. The method of claim 27 comprising the further step of charging the desired ones of the batteries according to said battery charging priority sequence.

29. The method of claim 27 wherein the battery charging priority sequence formed during said step of forming assigns a higher battery charging priority sequence to those of said selected ones of having greater battery charge states.

30. The method of claim 29 wherein the battery charging priority sequence formed during said step of forming includes only batteries having battery charge states indicative of less than fully charged states.

31. The method of claim 17 comprising the further step of indicating battery charge states of the selected ones of the batteries.

32. The method of claim 17 comprising the further step of applying a slow charging current to each of the batteries positioned in the battery charger.

33. A two-pocket battery charging system for determining battery charge states of batteries positioned at a first battery charging pocket and at a second battery charging pocket, said charging system comprising:

means for applying a fast charging current alternately to a first battery positioned in the first battery charging pocket and to a second battery positioned in the second battery charging pocket during a charge state determination period; and means for determining battery charge states of the first battery positioned in the first battery charging pocket and the second battery positioned in the second battery charging pocket after application of said charging current thereto.

34. A two-pocket battery charging system for determining priority of charging sequence in a sequential battery charger having a first battery charging pocket and a second battery charging pocket, said charging system comprising:

means for applying a fast charging current alternately to a first battery positioned in the first battery charging pocket and to a second battery positioned in the second battery charging pocket during a charge state determination period;

means for determining battery charge states of the first battery positioned in the first charging pocket and the second battery positioned in the second charging pocket after application of said charging current thereto; and means for forming priority of charging sequence responsive to to the battery charge states determined by the means for determining.

35. The two-pocket charging system of claim 40 wherein application of said fast charging current to the first battery positioned in the first battery charging pocket and the second battery positioned in the second battery charging pocket is alternated a multiplicity of times during said charge state determination period.

36. The two-pocket battery charging system of claim 34 wherein the first battery is assigned a highest priority in the priority of charging sequence formed by the means for forming when the battery charge state of the first battery is greater than the battery charge state of the second battery, and wherein the second battery is assigned a highest priority in the priority of charging sequence formed by the means for forming when the battery charge state of the second battery is greater than the battery charge state of the first battery.

* * * * *